United States Patent [19]

Workentine

[11] Patent Number: 4,856,686
[45] Date of Patent: Aug. 15, 1989

[54] CARGO CARRIER

[75] Inventor: Larry Workentine, Fresno, Calif.

[73] Assignee: Hike-A-Bike Incorporated, Fresno, Calif.

[21] Appl. No.: 152,695

[22] Filed: Feb. 5, 1988

[51] Int. Cl.$^4$ .............................................. B60R 9/10
[52] U.S. Cl. ........................... 224/42.07; 224/42.03 B
[58] Field of Search ................ 224/42.03 B, 42.03 A, 224/42.03 R, 42.06, 42.07, 42.08, 42.45 R, 42.46 R; 248/122; 211/182

[56] References Cited

U.S. PATENT DOCUMENTS

| 706,176 | 8/1902 | Hassett | 248/122 |
|---|---|---|---|
| 2,299,683 | 10/1942 | Curtis | 248/122 |
| 3,204,839 | 9/1965 | Yuda et al. | 224/42.03 B |
| 3,794,227 | 2/1974 | Stearns | 224/42.03 B |
| 3,853,255 | 12/1974 | Spencer | 224/42.03 B |
| 3,891,132 | 6/1975 | Chandler | 224/42.03 B |
| 4,136,806 | 1/1979 | Wisz | 224/42.45 R |
| 4,298,151 | 11/1981 | O'Connor | 224/42.03 B |
| 4,301,953 | 11/1981 | Abbott | 224/42.03 B |
| 4,380,344 | 4/1983 | Abbott | 280/402 |
| 4,381,069 | 4/1983 | Kreck | 224/42.08 |
| 4,461,410 | 7/1984 | Tartaglia | 224/42.03 B |
| 4,640,658 | 2/1987 | Webb, Jr. | 224/42.08 |
| 4,676,413 | 6/1987 | Began et al. | 224/42.03 B |
| 4,676,414 | 6/1987 | Deguevara | 224/42.03 B |
| 4,754,711 | 7/1988 | Solomon | 248/122 |

Primary Examiner—Henry J. Recla
Assistant Examiner—J. Casimer Jacyna
Attorney, Agent, or Firm—Townsend and Townsend

[57] ABSTRACT

A bicycle carrier is mounted to a vehicle having a receiver type hitch. The bicycle carrier includes an upright support having a rectangular collar fixed to its lower end and a bicycle carrier assembly at its upper end. The collar is sized to slide on a conventional rectangular receiver insert which is then mounted to the receiver supported by the vehicle. The collar is secured in place by a bolt which passes through the lower surface of the collar near the back edge of the collar to engage the receiver insert. The positioning of the bolt counteracts front to rear vibration of the upright support. The cargo carrier can be used while the receiver hitch is used for towing. The bicycle carrier includes a horizontal bar, rotatably mounted to the upper end of the upright support, having radially extending arms. The horizontal bar is positioned so the arms extend horizontally when in use and so the arms extend vertically, and out of the way, when not in use.

13 Claims, 2 Drawing Sheets

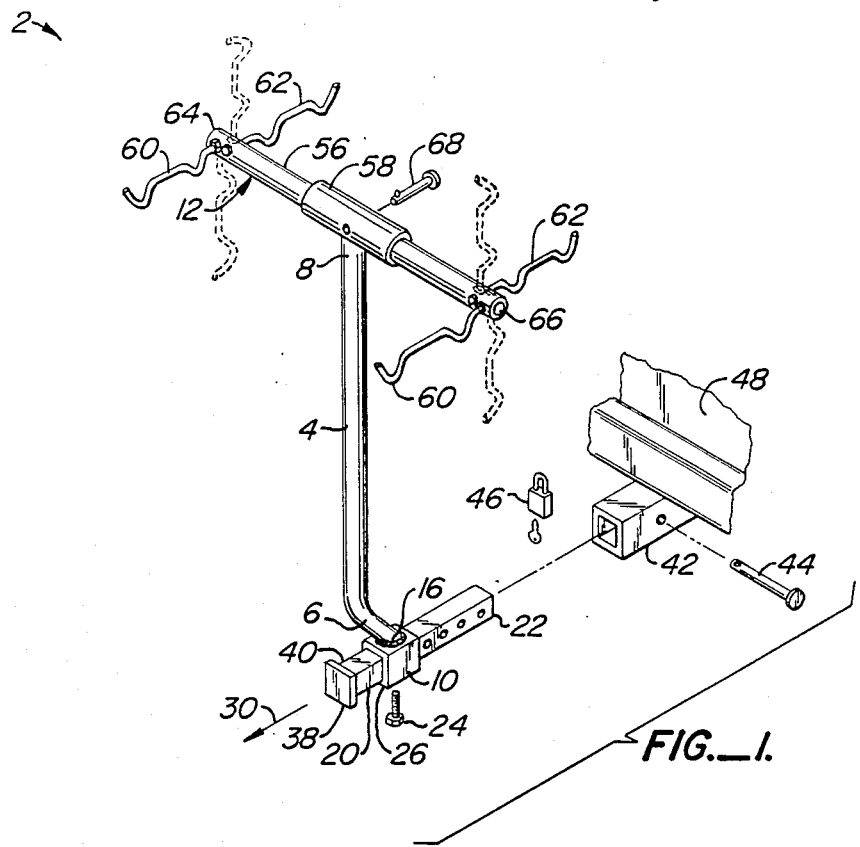
FIG._1.
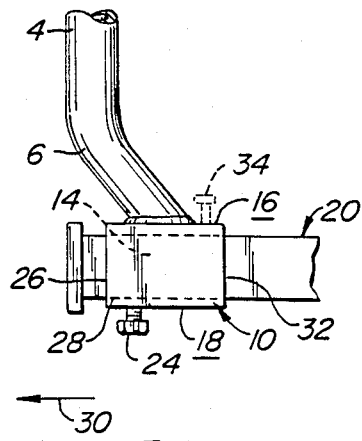
FIG._2.

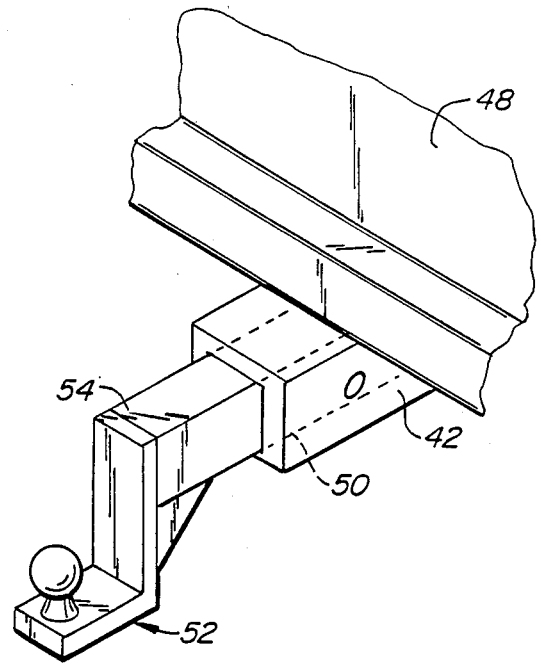
FIG._3.
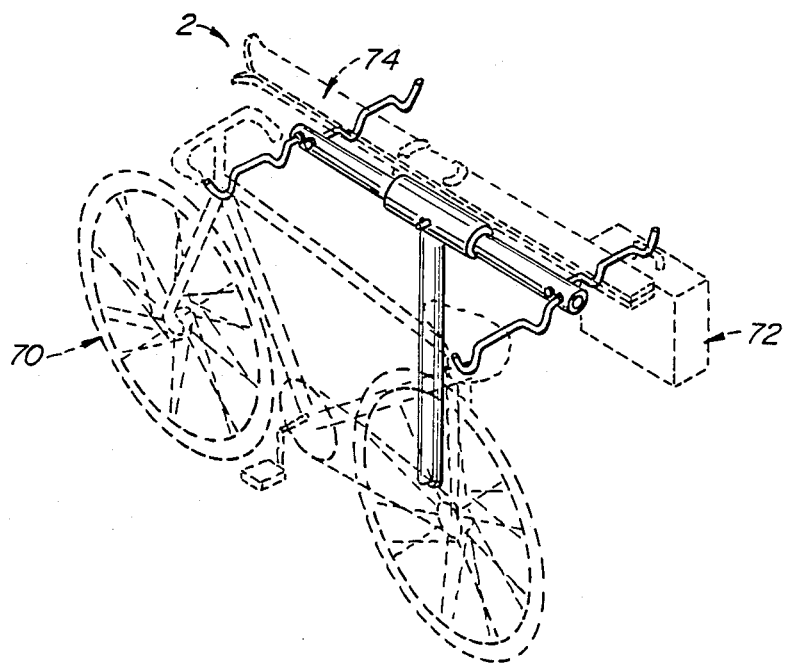
FIG._4.

CARGO CARRIER

BACKGROUND OF THE INVENTION

Transporting large, awkward or bulky items is a long-recognized problem. Specialized carriers have been developed for motorcycles, bicycles and skis. Some of these carriers are mounted directly to the bumper. Others, such as those shown in U.S. Pat. Nos. 4,301,953 to Abbott, 4,380,344 to Abbott, and 4,461,410 to Tartaglia are mounted to the tongue of a trailer hitch.

Another type of carrier is used with receiver type trailer hitches. These trailer hitches have a receiver mounted to the vehicle, the receiver having an elongate, rectangular receiver insert which is mounted within the receiver opening; the receiver insert has a ball hitch at the back end. The Abbott patents show structure for mounting a bicycle carrier to a receiver insert using a two-part saddle clamp which clamps over the receiver insert, the upright column being removably mounted to the saddle clamp. U.S. Pat. No. 4,676,414 to Deguevara shows a bicycle carrier which is fixed to a receiver insert. While the Abbott carriers allow for the normal use of the trailer hitch, the Deguevara bicycle carrier effectively eliminates such use.

SUMMARY OF THE INVENTION

Applicant's invention is directed to a cargo carrier usable with a receiver type hitch which does not limit the normal use of the hitch for towing purposes.

The cargo carrier, particularly useful for supporting bicycles, is mounted to a vehicle having a receiver type hitch. The cargo carrier includes an upright support having a rectangular collar mounted to its lower end and a cargo carrier assembly mounted to its upper end. The collar is sized to fit over a conventional rectangular receiver insert of the type having a ball hitch at the back end. The receiver insert is then mounted to the mating opening in the receiver. The invention is constructed so as not to interfere with the use of the ball hitch to tow a boat, a camper of other such vehicle.

The collar can be secured in place using a bolt mounted to the lower surface of the collar. The bolt passes through the collar to engage the receiver insert. The bolt, in the preferred embodiment, is positioned near the back edge of the collar so to counteract front to rear vibration of the upright support.

The cargo carrier assembly preferably includes a cylindrical bar rotatably mounted within a horizontally positioned support tube, the support tube mounted to the upper end of the upright support. When used as a bicycle carrier, bicycle supporting arms are mounted to the bar and extend radially from near the ends of the horizontal bar. The horizontal bar can be rotated within the horizontal support tube to assume a use position, in which the arms extend horizontally, and an inactive position, in which the arms extend vertically. While the cargo intended to be carried by the present invention is typically a bicycle of conventional construction, the cargo carrier is suited for carrying other cargo capable of being supported by a rotatable horizontal bar held within the horizontal support tube. Such alternate cargo could, for example, include suitcases, skis, and the like.

A primary advantage of the invention is that it can be used with conventional receiver type hitches without impairing the normal use of the hitch for towing. If desired, the standard receiver insert, having a ball hitch at the other end, can be replaced by a blank receiver insert having a limit plate at the back end of the receiver insert. In either case, since the collar cannot slip over the ball hitch or the limit plate, the cargo carrier can be secured to the vehicle by locking the receiver insert to the receiver using conventional methods to make the cargo carrier theft-resistant.

The cargo carrier can be used to support many different things. When used as a bicycle rack, the ability to pivot outwardly extending arms between the horizontal, use position and the vertical, inactive position helps keep the arms out of the way when not in use. Also, by using two pairs of arms, one pair extending backward and one pair extending forward, four bicycles can be supported by the cargo carrier in a more balanced manner.

Normally the weight of the cargo on the carrier assembly will tend to cause the upright support to tilt down and to the rear. Placing the positioning bolt on the lower surface of the collar towards its back edge (or on the upper collar surface towards its front edge) accommodates this natural tendency of the upright support to move the lower, rear edge and upper, front edge of the collar away from the receiver insert. The off-center placement of the positioning bolt resists front to rear vibration of the carrier. By permitting the collar to be positioned anywhere along the length of the receiver insert, an adjustable clearance between the upright support and the vehicle, such as to accommodate different size bumpers is achieved.

Other features and advantages of the invention will appear from the following description in which the preferred embodiments have been set forth in detail in conjunction with the accompanying drawings.

BRIEF DESCRIPTION OF THE DRAWINGS

FIG. 1 is an isometric view showing a cargo carrier made according to the invention mounted to a blank receiver insert and spaced apart from a vehicle mounted receiver, the vehicle shown schematically.

FIG. 2 is a side view of the lower end of the upright support and the collar of the cargo carrier of FIG. 1 showing the positioning bolt at the lower surface of the collar.

FIG. 3 shows a conventional receiver insert used with a rectangularly-shaped vehicle mounted receiver such as shown in FIG. 1 with which the cargo carrier of FIG. 1 can be used.

FIG. 4 is an isometric view of the upper portion of the cargo carrier of FIG. 1, showing the placement of various cargo thereon.

DETAILED DESCRIPTION OF THE PREFERRED EMBODIMENT

Referring now to FIG. 1, a cargo carrier 2 is shown to include an upright support 4, having lower and upper ends 6, 8 to which a collar 10 and a bicycle carrier assembly 12 are mounted. Collar 10 is a rectangular tube having a through hole 14, and upper surface 16, to which lower end 6 is welded, and a lower surface 18. Collar 10 is slidably mounted over a blank receiver insert 20 by inserting the front end 22 of insert 20 through through hole 14.

Collar 10 is secured to a desired position along receiver insert 20 through the use of a positioning bolt 24, shown in FIG. 2. Bolt 24 is threadably mounted to collar 10 at lower surface 18, passes through the collar and enters through hole 14 so to engage receiver insert 20. Placing bolt 24 near the back edge 26 of collar 10 forces the lower portion 28 of back edge 26 downwardly, away from receiver insert 20. This off-center placement is done to counteract front to rear vibration of upright support 4, rear or back being in the direction of arrow 30 while front being in the opposite direction. Bolt 24 is positioned adjacent back edge 26 rather than towards front edge 32 of collar 10 because in the preferred embodiment, and typically, the tendency of a loaded cargo carrier 2 will be to rotate collar 10 in a counterclockwise direction as viewed in FIG. 2. Thus, positioning bolt 24 adjacent lower portion 28 of back edge 26 reinforces the natural tendency of lower portion 28 to move away from receiver insert 20.

Instead of mounting bolt 24 to lower surface 18, a positioning bolt 34 could be mounted to upper surface 16 adjacent the upper portion 36 of front edge 32 as indicated in dashed lines in FIG. 2. To accommodate situations in which the load on cargo carrier 2 is such to tend to rotate collar 10 in a clockwise direction, again referring to FIG. 2, additional threaded holes may be provided in one or both of upper and lower surfaces 16, 18 near back and front edges 26, 32 respectively. Although arms 60, 62 are especially well adapted for carrying cargo such as a bicycle 70 of mopeds, other cargo capable of being supported by the carrier assembly 12 may also be carried. With reference to FIG. 4, skis 74 or other relatively long objects cold be laid across the uppermost surface of arms 60, 62 and lashed or otherwise secured for carrying. Alternatively, cargo such as a suitcase 72 or the like could be lashed or otherwise secured to the upper-most and/or lower-most surfaces of arms 60, 62 for carrying. While a bicycle 70, suitcase 72 and skis 74 are shown in FIG. 4, it is understood that the cargo carriable by the present invention is not limited to such items.

The embodiment of FIG. 1 shows a blank receiver insert 20 having an oversized limit plate 38 mounted to the back end 40 of receiver insert 20. Thus once front end 22 is mounted within a vehicle mounted receiver 42 and locked in place, such as by using pin 44 and lock 46, cargo carrier 2 can be removed from vehicle 48 only by breaking lock 46.

The embodiment of FIG. 1 is shown with a blank receiver insert 20. However, one of the main advantages of the invention is that it is quite adaptable for use with a conventional receiver insert 50 as shown in FIG. 3. Receiver insert 50, having a ball hitch 52 at the back end 54 remains usable for towing with cargo carrier 2 in use.

Returning again to FIG. 1, a bicycle carrier assembly 12 is shown to include a cylindrical horizontal bar 56 mounted to upper end 8 of upright support 4 by a horizontal support tube 58. Bar 56 has first and second pairs of arms 60, 62 extending in opposite radial directions at the ends 64, 66 of bar 56. Bar 56 is positioned in one of two rotary orientations through the use of a removable pin 68 which passes through appropriately sized and positioned openings in tube 58 and bar 56. The openings are positioned so that arms 60, 62 assume either the generally horizontal, solid line, use position of FIG. 1 or the generally vertical, dashed line, inactive position of FIG. 1. Thus, when cargo carrier 2 is not actually supporting a cargo, horizontal bar 56 can be rotated to position arms 60, 62 in the dashed line, generally vertical, inactive position so they are less obstructive and less likely to cause injury to someone walking past them.

In use, the front end 22 of receiver insert 20 (or insert 50) is inserted through through hole 14 of collar 10, after which front end 22 is mounted to receiver 42 and secured at an appropriate position using pin 44 and lock 46. Collar 10 is then positioned along receiver insert 20 and secured in place using positioning bolt 24. Horizontal bar 56 is rotated, if need be, so that arms 60, 62 are in their horizontal, use position and are secured in that position by pin 68. The cargo, typically bicycles, is then mounted to one or both of arms 60, 62 and secured in place in an appropriate manner, such as with bungy cords. When a conventional receiver insert 50 is used, trailering of a load remains possible even though cargo carrier 2 is also in use. When the cargo is removed, pin 68 can be removed, bar 56 rotated so arms 60, 62 are generally vertical and pin 68 replaced to keep arms 60, 62 out of the way. FIG. 4 shows, by way of example, a two wheel bicycle 70 attached to arms 60, a suit case 72 attached to one arm 62 and skis 74 attached across arms 62.

Modifications and variations can be made to the disclosed embodiments without departing from the subject of the invention as defined in the following claims. For example, carrier assembly 12 could be adapted for other types of cargo, such as skis, wheelchairs, surfboards, and so forth. The rotatable positioning of bar 56 could be an advantage with cargo carriers other than bicycle carriers, depending upon the configuration of the particular mounting structure used. Only one pair of arms 60, 62 need be used on bicycle carrier assembly 12. Although each pair of arms 60, 62 is capable of supporting two bicycles, arms of other configurations or of different capacities could also be used.

I claim:

1. A cargo carrier for use with a receiver hitch of the type having a receiver with a rectangular opening, the receiver mounted to a vehicle, a receiver insert sized for mating engagement within the opening, and means for securing the receiver insert to the receiver, the cargo carrier comprising:
   an upright support having a single vertical support bar with an upper end and a lower end;
   a collar, nonremovably fixed to the lower end of the upright support, defining a through hole sized for slidably mating engagement with the receiver insert of the receiver hitch with which the cargo carrier is used;
   means for securing the collar at a chosen position along the receiver insert;
   a generally horizontal bar having ends in perpendicular relation to said hole through said collar;
   means for movably mounting the horizontal bar to the upper end of the upright support;
   arms, adapted to receive receiving cargo, extending transversely from each end of the bar in parallel relation to each other; and
   means for positioning the horizontal bar in a first position, at which the arms extend generally horizontally for receiving cargo, and a second position, at which the arms extend generally vertically;
   whereby the vehicle may tow a load connected to the receiver insert while carrying cargo with the cargo carrier, and positioning the horizontal bar in the second position stows the arms.

2. The cargo carrier of claim 1 wherein the collar securing means includes means for opposing vibration of the upright support.

3. The cargo carrier of claim 2 wherein the vibration opposing means includes means for opposing front to rear vibration.

4. The cargo carrier of claim 1 wherein the collar includes a top and bottom and the securing means includes a fastener element mounted to a chosen one of the top and the bottom.

5. The cargo carrier of claim 4 wherein the fastener element passes through the collar and extends into the through hole.

6. The cargo carrier of claim 4 wherein the collar has a rear end and a front end and the fastener element is mounted towards a chosen one of the rear and front ends so to counteract front to rear vibration of the upright support.

7. The cargo carrier of claim 4 wherein the collar has a rear end away from the receiver and the fastener element is mounted to the bottom of the collar towards the rear end so to counteract front to rear vibration of the upright support.

8. The cargo carrier of claim 4 wherein the fastener element includes a bolt.

9. The cargo carrier of claim 1 wherein the movably mounting means includes a hollow tube secured to the upper end of the upright support, and the positioning means includes a pin and openings formed in the hollow tube and horizontal bar for receipt of the pin.

10. The cargo carrier of claim 1 including at least four of said arms, two of which extend in one direction and two of which extend in a direction opposite the one direction.

11. A cargo carrier for use with a receiver hitch of the type having a receiver with a rectangular opening, the receiver mounted to a vehicle having a bumper, a receiver insert having a towing ball, the receiver insert sized for mating engagement within the opening, and means for securing the receiver insert to the receiver, the cargo carrier comprising:
   an upright support having a single vertical support bar with an upper end and lower end offset with respect to the upper end;
   a collar, nonremovably fixed to the lower end of the upright support, defining a through hole sized for slidably mating engagement with the receiver insert of the receiver hitch with which the cargo carrier is used;
   means for securing the collar at a chosen position along the receiver insert;
   a generally horizontal bar having ends in perpendicular relation to said hole through said collar;
   means for movably mounting the horizontal bar to the upper end of the upright support;
   arms, adapted to receive receiving cargo, extending transversely from each end of the bar in parallel relation to each other; and
   means for positioning the horizontal bar in a first position, at which the arms extend generally horizontally for receiving cargo, and a second position, at which the arms extend generally vertically;
   whereby the vehicle may tow a load connected to the towing ball while carrying cargo with the cargo carrier, and positioning the horizontal bar in the second position stows the arms, and the offset lower end of the upright support permits the upright support to clear the bumper while reducing the distance between the bumper and the towing ball, reducing thereby a moment arm and resultant torque created by the cargo carrier upon the vehicle.

12. A cargo carrier, for use with a vehicle mounted receiver type hitch having a receiver mounted to the vehicle, the vehicle having a front and a rear, the receiver having a rectangular receiver insert opening, the hitch also having a receiver insert sized for mating engagement within the opening and means for securing the receiver insert to the receiver, the carrier comprising:
   an upright support having a single vertical support bar with an upper end and a lower end;
   a collar nonremovably fixed to the lower end of the upright support, the collar defining a through hole sized for slidable mating engagement with the receiver insert of the receiver hitch with which the cargo carrier is used, the collar having a top, a bottom, a front edge and a rear edge;
   a fastener element passing through a chosen one of the top and the bottom of the collar for securing the collar to a chosen position along the receiver insert, the fastener element positioned near a selected one of the front and rear edges to oppose front to rear vibration of the upright support; and
   a carrier assembly mounted to the upper end of the upright support for supporting cargo, the carrier assembly including a horizontally positioned hollow tube secured to the upper end of the upright support in perpendicular relation to said hole through said collar, a bar rotatably mounted within the hollow tube, cargo engaging arms extending in parallel relation to each other and transversely from the bar at opposite ends thereof and means for selectively positioning the bar in a first rotary position, at which the arms extend generally horizontally for receiving cargo, and a second rotary position, at which the arms extend generally vertically.

13. The cargo carrier of claim 12 wherein the fastener element is positioned near the rear edge at the bottom of the collar and the arms are configured for supporting bicycle.

* * * * *